UNITED STATES PATENT OFFICE.

THOMAS O. OLIVER, OF NEW YORK, N. Y., ASSIGNOR TO HIMSELF AND WM H. FARRAR, OF OREGON.

IMPROVEMENT IN LINING PETROLEUM-BARRELS, &c.

Specification forming part of Letters Patent No. 47,363, dated April 18, 1865.

*To all whom it may concern:*

Be it known that I, THOMAS O. OLIVER, of New York city, New York, have invented certain new and useful Improvements in Composition for Rendering Barrels for Petroleum and other Substances Tight and Impervious; and I hereby declare the following to be a full, clear, and exact description of the same.

The nature of my invention consists in applying the substance derived from the leaves and stems of the *Opunta vulgaris* or *Cactus vulgaris* (or prickly-pear) by the process of boiling the same for a sufficient length of time so that the liquid, when cool, will be of the consistency of ordinary glue. I then mix the same with whiting, lime, flour, bran, or other material, so as to produce the consistency of common paint, and I then apply it, when hot, to the insides of barrels or other vessels, completely saturating the wood and joints with this composition. After its application, as above described, and when nearly cold, I apply a composition made of glue, molasses, isinglass, and gum-shellac. This composition I put over the former while it is quite hot, but not boiling, and, being applied before the first composition becomes cold, it unites with it, constituting a substance almost as durable and as hard as porcelain, without the danger of breaking or cracking, and which is not affected by climate.

I do not confine myself to the use of the prickly-pear alone in the production of my first composition, but can use the *Partederia c rdata*, or other similar plants of analogous properties.

One of the important advantages resulting from the use of the preliminary preparation is found in the fact that by its use the pores of the wood are closed, and the surface of the wood is properly fitted for the reception of the second application, which is by this means rendered much more effective and valuable.

Both the first and second compositions herein described may be incorporated before being applied, as well as being separately used, as hereinbefore provided.

Having thus fully described my said improvement, what I claim as my invention, and desire to secure by Letters Patent, is—

1. A preparation composed of the juice of the prickly-pear or other gelatinous plants, mixed with lime, plaster-paris, flour, bran, or other similar substances as a priming or preliminary application to the inside of barrels or other vessels, as and for the purposes set forth.

2. The combination of a first and second application to the inner surfaces of barrels or other vessels, as described.

3. The application of the ingredients herein described when incorporated in one composition and applied substantially as and for the purposes herein set forth.

THOS. O. OLIVER.

Witnesses:
C. W. STAFFORD,
WM. T. DENNIS.